US010156156B2

(12) United States Patent
Dowdell

(10) Patent No.: US 10,156,156 B2
(45) Date of Patent: Dec. 18, 2018

(54) TOOLING PRODUCTION METHOD

(71) Applicant: ROLLS-ROYCE PLC, London (GB)

(72) Inventor: David Dowdell, Diss (GB)

(73) Assignee: ROLLS-ROYCE PLC, London (GB)

( * ) Notice: Subject to any disclaimer, the term of this patent is extended or adjusted under 35 U.S.C. 154(b) by 528 days.

(21) Appl. No.: 14/871,046

(22) Filed: Sep. 30, 2015

(65) Prior Publication Data

US 2016/0096288 A1   Apr. 7, 2016

(30) Foreign Application Priority Data

Oct. 7, 2014 (GB) .................................. 1417695.2

(51) Int. Cl.
| F01D 25/00 | (2006.01) |
| F01D 25/24 | (2006.01) |
| B29C 33/30 | (2006.01) |
| F02C 7/12 | (2006.01) |
| F02C 7/32 | (2006.01) |
| B29L 31/00 | (2006.01) |

(52) U.S. Cl.
CPC .......... *F01D 25/005* (2013.01); *B29C 33/301* (2013.01); *F01D 25/24* (2013.01); *F02C 7/12* (2013.01); *F02C 7/32* (2013.01); *B29L 2031/757* (2013.01); *F05D 2300/603* (2013.01); *Y02T 50/672* (2013.01); *Y02T 50/675* (2013.01)

(58) Field of Classification Search
CPC .......... F01D 25/005; F01D 25/24; F02C 7/32; F02C 7/17; B29C 33/301; B29L 2031/757
See application file for complete search history.

(56) References Cited

U.S. PATENT DOCUMENTS

| 6,627,835 B1 | 9/2003 | Chung et al. |
| 2004/0050498 A1 | 3/2004 | Herrmann et al. |
| 2010/0032862 A1 | 2/2010 | Micheaux et al. |
| 2012/0023727 A1 | 2/2012 | Meyer et al. |
| 2013/0160458 A1 | 6/2013 | Willmot et al. |

FOREIGN PATENT DOCUMENTS

| EP | 2 407 292 A1 | 1/2012 |
| EP | 2607651 A2 | 6/2013 |
| WO | 2005/05049298 A1 | 6/2005 |
| WO | 2014/14053141 A1 | 4/2014 |

OTHER PUBLICATIONS

Mar. 1, 2016 Search Report issued in European Patent Application No. 15 18 7558.
Apr. 1, 2015 Search Report issued in British Patent Application No. GB1417695.2.

*Primary Examiner* — Moshe Wilensky
(74) *Attorney, Agent, or Firm* — Oliff PLC

(57) ABSTRACT

A method is provided of producing a tooling to be used for manufacturing a rigid panel formed of polymer matrix composite material. The panel is for attachment to a gas turbine engine and has a curved shape which allows the panel to be wrapped around at least a part of a circumference of the engine. The panel has plural electrical conductors and/or fluid passages embedded therein. The tooling is either a mould against which the polymer matrix composite material can be moulded to manufacture the panel, or a pattern from which such a mould can be formed. The method includes: providing a plurality of separate tooling segments, each of which corresponds to a respective region of the curved shape of the panel; and joining the tooling segments together to produce the tooling.

4 Claims, 3 Drawing Sheets

TOOLING PRODUCTION METHOD

CROSS-REFERENCE TO RELATED APPLICATIONS

This application is based upon and claims the benefit of priority from British Patent Application Number 1417695.2 filed 7 Oct. 2015, the entire contents of which are incorporated by reference.

BACKGROUND

1. Field of the Disclosure

The present disclosure relates to a method of producing a tooling to be used for manufacturing a rigid panel formed of polymer matrix composite material, a method of manufacturing a rigid panel, an a rigid panel.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, is commonly transmitted along conductors. Conventionally, such conductors may be in the form of wires and/or cables which are assembled together in a harness. In such a conventional harness, each wire may be surrounded by an insulating sleeve, which may be braided or have a braided cover.

The harnesses are assembled from individual wires and cables which are held together over at least part of their lengths by suitable sleeving and/or braiding. Individual wires and cables emerge from the sleeving or braiding to terminate at plug or socket connector components for cooperation with complementary socket or plug connector components on, or connected to, the respective electrical components.

Each conventional harness comprises a multitude of insulated wires and cables. This makes the conventional harness itself bulky, heavy and difficult to manipulate. The conventional harnesses occupy significant space within a gas turbine engine (for example within the nacelle of a gas turbine engine), and thus may compromise the design of the aircraft, for example the size and/or weight and/or shape of the nacelle.

Conventional harnesses comprise a large number of components, including various individual wires and/or bundles of wires, supporting components (such as brackets or cables) and electrical and/or mechanical connectors. This can make the assembly process complicated (and thus susceptible to errors) and/or time consuming. Disassembly of the conventional harnesses (for example removal of the conventional harnesses from a gas turbine engine during maintenance) may also be complicated and/or time consuming. Thus, in many maintenance (or repair or overhaul) procedures on a gas turbine engine, removal and subsequent refitting of the conventional electrical harness may account for a very significant portion of the operation time and/or account for a significant proportion of the potential assembly errors.

The electrical conductors in the conventional harnesses may be susceptible to mechanical damage. For example, mechanical damage may occur during installation (for example through accidental piercing of the protective sleeves/braiding) and/or during service (for example due to vibration). In order to reduce the likelihood of damage to the conductors in a conventional harness, the protective sleeves/braiding may need to be further reinforced, adding still further weight and reducing the ease with which they can be manipulated. Similarly, the exposed electrical connectors used to connect one conductor to another conductor or conductors to electrical units may be susceptible to damage and/or may add significant weight to the engine.

Similar problems can be associated with fluid passages carrying e.g. hydraulic or pneumatic fluid.

Accordingly, it has been proposed to replace conventional harnesses with rigid panels, typically formed of composite material, in which electrical conductors and/or fluid passages are embedded in the panel. See, for example, US 2013/160458 (hereby incorporated by reference) for a description of such a panel or "raft".

Transferring electrical signals using an embedded electrical system of a rigid panel can provide a number of advantages over transferring electrical signals using a conventional harness. For example, during assembly and in use, such panels may provide greater protection to their electrical conductors than conventional harnesses. Further, the use of such panels may significantly reduce the build and maintenance times of an engine, and/or reduce the possibility of errors occurring during such procedures. The panels can also provide weight and size advantages over conventional harnesses. Similar advantages accrue when fluids are transferred using the embedded fluid system of the rigid panel.

Such panels can conveniently be formed by moulding a polymer matrix composite material against a mould which is a "negative" of the final panel. The mould can be formed directly, e.g. from tooling board or aluminium alloy, or it can itself be formed by moulding a (typically composite) material against a pattern which is a "positive" of the final panel.

The panels can be of large size (e.g. several metres in length) and typically have a curved shape which allows them to be wrapped around at least a part of a circumference of the engine (e.g. around a fan case). In addition, it is common to add additional detailed patterns/moulds to the larger pattern/mould in order to form smaller details of the panel.

A problem arises, however, in that production of the tooling cannot be started until a final design for the panel is complete. This can delay the production of the tooling with a corresponding impact on the length of the entire the design-to-manufacture program for the finished panel. Subsequently, if modifications to the panel are required, then these can be costly and time-consuming to implement in the tooling.

OBJECTS AND SUMMARY

Accordingly, in a first aspect, the present invention provides a method of producing a tooling to be used for manufacturing a rigid panel formed of polymer matrix composite material, the panel being for attachment to a gas turbine engine and having a curved shape which allows the panel to be wrapped around at least a part of a circumference of the engine, and the panel having plural electrical conductors and/or fluid passages embedded therein, the tooling being either a mould against which the polymer matrix composite material can be moulded to manufacture the panel, or a pattern from which such a mould can be formed, the method including:

providing a plurality of separate tooling segments, each of which corresponds to a respective region of the curved shape of the panel; and joining the tooling segments together to produce the tooling.

Where reference is made herein to a curved shape (for example in the context of the panel being a curved shape), it will be understood that this includes generally curved and/or curved on a macroscopic level, and therefore includes shapes which comprise a series of flat facets that combine to form a generally curved overall shape.

By forming the tooling from separate tooling segments, each segment can be produced individually as and when the detailed design for that segment is completed, thereby speeding up the production of the tooling. Further, if a modification to the panel is required, it may be necessary to alter only one or a few of the segments, which can reduce the time to implement the modification. In particular, relatively small segments can be re-machined on a small machine tool, whereas re-machining of a complete tooling can require a much larger machine tool.

The panel may have a plurality of flat facets which combine to form the curved shape. In this case, each tooling segment can correspond to a respective one of the facets. It can be difficult and expensive to locate features onto a curved surface, for example as flats may have to be specially machined. However, by forming panel as a facetted curved shape such problems can be avoided. Further, by forming each tooling segment a respective one of the facets, the production of the individual segments can be simplified, as it is generally easier to produce a flat shape than a curved shape.

The tooling segments can be joined together in the tooling by known joining techniques, such as location pins and bolts.

The method may further include providing a support structure to support the joined tooling segments in the tooling.

The segments may all be of a standard length (in the axial direction of the engine, for example), and of a standard angular extent (around the circumference of the engine). Standardisation of the segments in this way can further speed up the production of the tooling.

A further aspect of the present invention provides a process for manufacturing a rigid panel formed of polymer matrix composite material, the panel being for attachment to a gas turbine engine and having a curved shape which allows the panel to be wrapped around at least a part of a circumference of the engine, and the panel having plural electrical conductors and/or fluid passages embedded therein, the process including:
performing the method of the first aspect, the tooling being a mould; and
moulding polymer matrix composite material against the mould to manufacture the panel.

And a related further aspect of the present invention provides a process for manufacturing a rigid panel formed of polymer matrix composite material, the panel being for attachment to a gas turbine engine and having a curved shape which allows the panel to be wrapped around at least a part of a circumference of the engine, and the panel having plural electrical conductors and/or fluid passages embedded therein, the process including:
performing the method of the first aspect, the tooling being a pattern;
using the pattern to form a mould; and
moulding polymer matrix composite material against the mould to manufacture the panel.

The process of either of these further aspects may further include attaching the panel to a gas turbine engine such that the panel wraps around at least a part of a circumference of the engine.

In another aspect, the present invention provides a rigid panel formed of polymer matrix composite material, the panel being for attachment to a gas turbine engine and having a curved shape (e.g. a facetted curved shape) which allows the panel to be wrapped around at least a part of a circumference of the engine, and the panel having plural electrical conductors and/or fluid passages embedded therein, wherein the panel is manufactured according to the process of the previous aspects.

According to an aspect, there is provided a rigid panel formed of polymer matrix composite material, the panel being for attachment to a gas turbine engine and comprising plural electrical conductors and/or fluid passages embedded therein, wherein: the rigid panel comprises a plurality of flat facets which combine to form a curved shape which allows the panel to be wrapped around at least part of a circumference of the engine.

In another aspect, the present invention provides a gas turbine engine to which is attached the panel of the previous aspect.

Further optional features of the invention will now be set out. These are applicable singly or in any combination with any aspect of the invention.

The panels may be referred to as rafts, rigid rafts, electrical rafts, or rigid electrical rafts.

The composite material may have a particulate or fibre reinforced polymer matrix, such as a continuous fibre reinforced polymer matrix. The composite material may comprise any suitable combination of resin and fibre as desired for a particular application. Any suitable fibres may be used, for example carbon fibres, glass fibres, aramid fibres, and/or para-aramid fibres. The fibres may be of any type, such as woven and/or chopped. Any suitable resin may be used, for example epoxy, BMI (bismaleimide), PEEK (polyetheretherketone), PTFE (polytetraflouroethylene), PAEK (polyaryletherketone), polyurethane, and/or polyamides (such as nylon).

The panel may have one or more electrical conductors embedded therein. Such electrical conductors may be in the form of, for example, one or more flexible printed circuits, one or more wires (which may be sheathed), or a combination thereof.

The panel may comprise one or more electrical connectors or sockets, which may be electrically connected to the electrical conductors, e.g. by mechanical crimping. The electrical connector or socket may allow electrical connection of the panel to other electrical components, for example to other such structures (either directly or indirectly, via an electrical cable or lead) or to electrical units (again, either directly or indirectly, via an electrical cable or lead). Such an electrical connector or socket may take any suitable form, and may be at least partially embedded in the structure.

The panel may have one or more fluid passages embedded therein. The fluid passages may be part of a fluid system, such as a gas system (for example carrying pneumatic or cooling gas/air), and/or a liquid system (for example carrying a fuel, hydraulic and/or lubricant liquid).

The panel may be provided in any suitable location/position of the gas turbine engine, for example to a mounting structure at any suitable location. For example, the panel may be attached to the engine core case or engine fan case, for example to a mounting structure on such cases.

Other components/systems of a gas turbine engine may be provided to the panel in any suitable manner. Thus, a surface of the panel may be used as a mounting surface for other gas turbine engine components/systems.

For example, one or more electrical units may be mounted on the panel. The electrical unit(s) may be any type of electronic control unit (ECU), such as an Electronic Engine Controller (EEC) and an Engine Health Monitoring Unit (EMU). The panel may be a particularly convenient, lightweight and/or compact way of providing (for example attaching, fixing or mounting) an electrical unit to a turbine engine. For example, the electrical unit and the panel may be assembled together (mechanically and/or electrically) before being installed on the gas turbine engine.

The panel may be provided with at least one mount on which other components (e.g. auxiliary/ancillary components/systems) of the gas turbine engine may be mounted. The mount may be a bracket, for example a bespoke bracket for the component/system mounted thereon or a conventional/standard bracket. Fluid pipes for transferring fluid around the engine may be mounted to the panel (e.g. mechanically mounted using a bracket), and thus to the engine.

One or more anti-vibration mounts may be used to attach the panel to another component, thereby allowing the panel to be vibration isolated (or at least substantially vibration isolated). Using an anti-vibration mount to attach the panel to a gas turbine engine may reduce (or substantially eliminate) the amount of vibration being passed to the panel from the gas turbine engine, for example during use. This may help to prolong the life of the panel. Furthermore, any other components that may be attached to the panel may also benefit from being mounted to the gas turbine engine via the anti-vibration mounts, through being mounted on the panel.

BRIEF DESCRIPTION OF THE DRAWINGS

Embodiments of the invention will now be described by way of example with reference to the accompanying drawings in which.

DETAILED DESCRIPTION OF EMBODIMENTS

Figure 1:
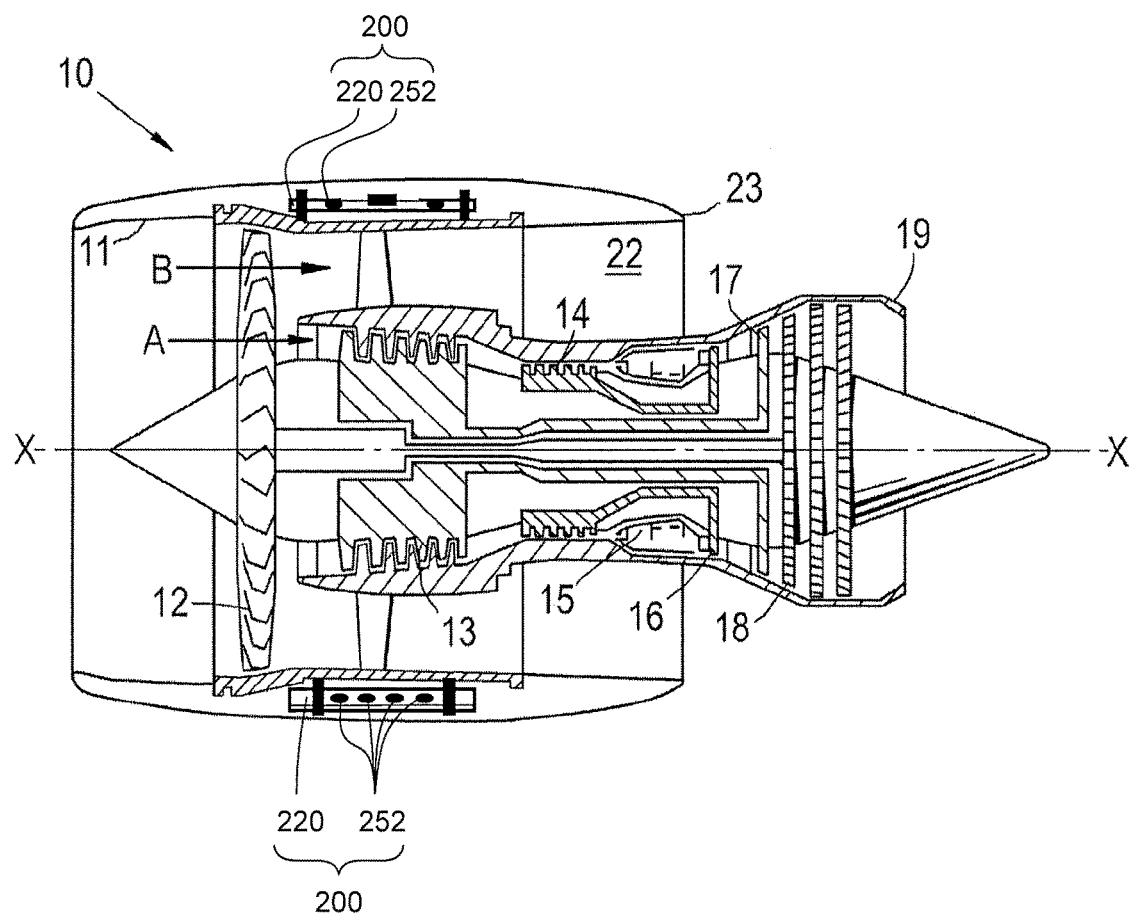
FIG. 1 shows a longitudinal cross-section through a ducted fan gas turbine engine.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 1 shows two electrical panels 200 which may be used to transmit/transfer electrical signals (or electricity, including electrical power and/or electrical control signals) around the engine and/or to/from the engine 10 from other components, such as components of an airframe.

Each electrical panel 200 comprises at least one electrical conductor 252 embedded in a rigid composite material 220. The electrical conductors 252 in the electrical panel 200 may be provided in a harness, which may be a flexible circuit.

Each electrical panel 200 is manufactured by a moulding method. For example, the rigid material 220 may initially be provided as layers of flexible material, such as (by way of example only) layers of fibre and resin compound. This flexible material may be placed against a mould having a desired shape. Other components (such as fluid pipes and/or the electrical conductors 252, which may be embedded in a flexible circuit) may also be placed into the mould, for example between layers of the flexible material from which the rigid material 220 is ultimately formed.

Figure 2:
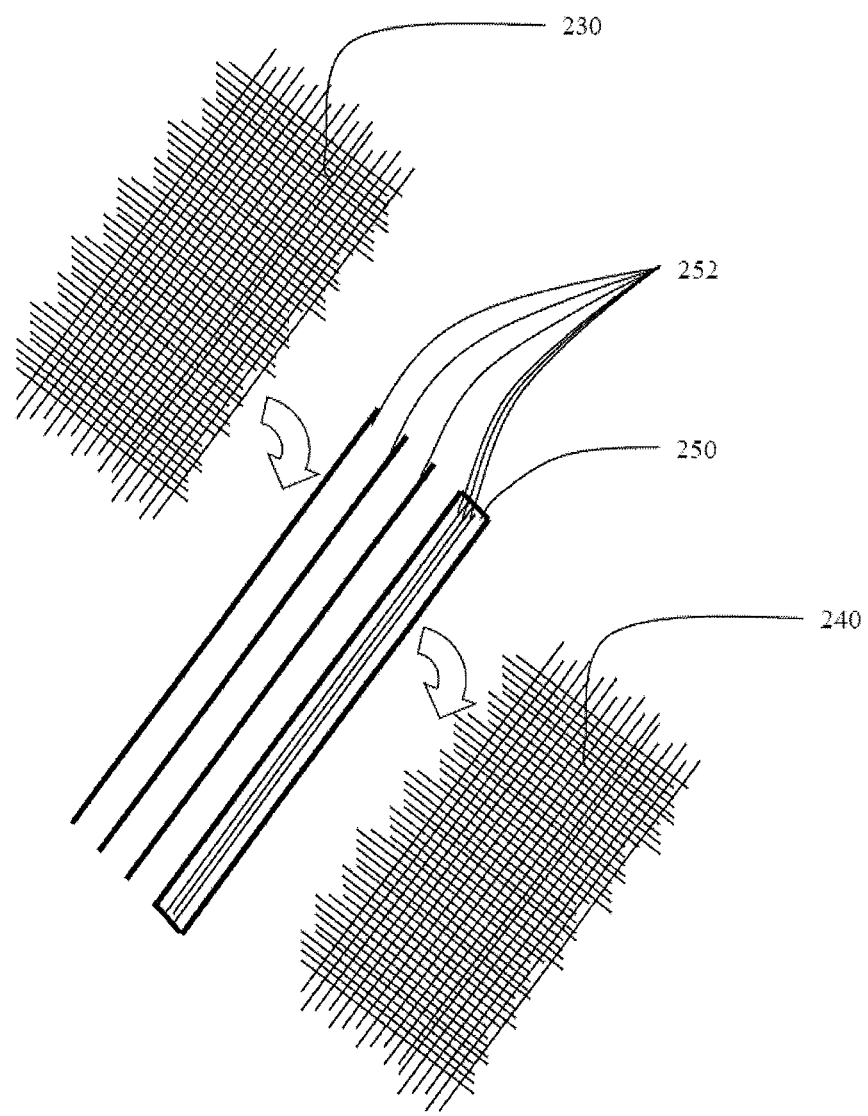
FIG. 2 shows components of an example of an electrical panel prior to moulding.

FIG. 2 shows components of an example of an electrical panel 200 prior to moulding. The electrical conductors 252 are provided between two layers of material 230, 240 that, after construction, form the rigid material 220. Some of the electrical conductors 252 are provided in a flexible circuit 250. Others may be single tracks, each surrounded by an electrically insulating sleeve. The material 230, 240 may be a fibre and resin compound. Such a fibre and resin compound may, after suitable treatment (for example heat treatment), produce the rigid composite material 220. In the example of FIG. 2, the fibre and resin compound is formed of a sheet of interwoven fibres, or strands. The strands in FIG. 2 extend in perpendicular directions, although the strands may extend in any one or more directions as required. The strands/fibres may be pre-impregnated (or "pre-pregged") with the resin.

Prior to any treatment, both the first and second layers 230, 240 and the electrical conductors 252 may be flexible, for example supple, pliable or malleable. As such, when the layers 230, 240 and the electrical conductors 252 are placed together, they may be moulded, or formed, into any desired shape. For example, the layers 230, 240 and the electrical conductors 252 may be placed against the mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final panel to adopt shapes that are curved in two-dimensions or three-dimensions.

Any suitable moulding method could be used to produce the electrical panel 200. For example, the strands/fibres need not be pre-impregnated with the resin. Instead, the fibres/strands could be put into position (for example relative to electrical conductors 252/flexible circuit 250) in a dry state, and then the resin could be fed (or pumped) into the mould. Such a process may be referred to as a resin transfer method. In some constructions no fibre may be used at all in the rigid material 220.

Figure 3:
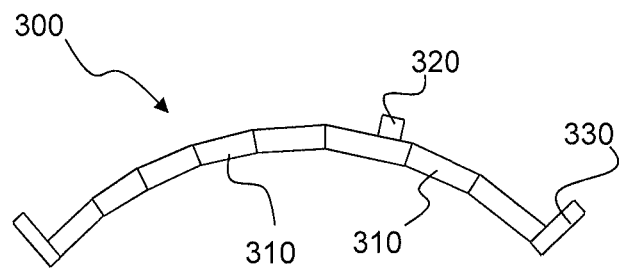
FIG. 3 shows schematically a transverse cross-section through a pattern used to form a mould for moulding one of the panels of the engine of FIG. 1.

FIG. 3 shows schematically a transverse cross-section through a pattern 300 used to form a mould for moulding one of the panels 200. The pattern 300 is formed from a plurality of separate pattern segments 310 which are joined (e.g. bolted) together to form the complete pattern. A support structure (not shown) may be used to support the segments 310.

The segments 310 are planar and combine to form a pattern 300 which has curved facetted shape. This is also the shape of the final panel 200 and allows it to wrap around the fan case of the engine. The flat segments are simple to produce, and the facets on the finished panel provide convenient mounting surfaces for other components.

Preferably, the segments 310 are all of a standard length and of a standard angular extent, which can help to speed up the production of the pattern. However, this need not be the case, and some arrangements may have segments with different lengths and/or angular extents to other segments.

Some of the segments 310 have detail features 320, such as brackets of connectors, or return features 330. Advantageously, by forming the pattern 300 from a plurality of such segments 310, each segment can be produced as that design detail of that part of panel is finalised.

Figure 4:
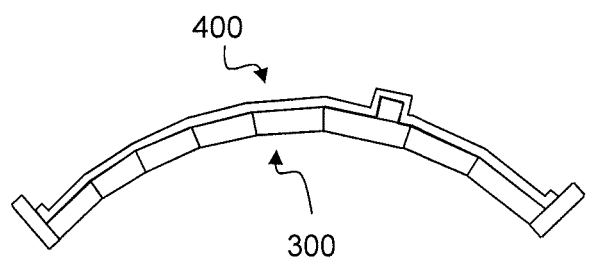
FIG. 4 shows the pattern of FIG. 3 used to form a mould.
Figure 5:
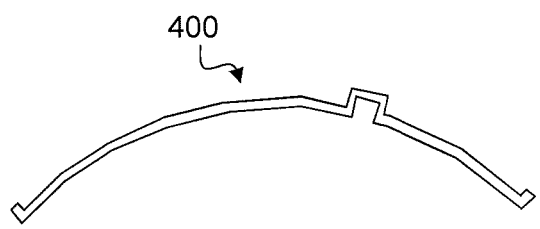
FIG. 5 shows the mould of FIG. 4 separated from the pattern.

Having produced the pattern 300, it is used to form a corresponding curved facetted mould 400 (FIG. 4). This can be done, for example, by laying up composite material against the pattern, curing the composite material, and then separating it from the pattern (FIG. 5). The mould can be used to manufacture the panel 200 by moulding polymer matrix composite material against mould 400 as described above.

Instead of producing a pattern from segments and then forming the mould, another option is to provide mould segments (e.g. formed from tooling board or aluminium) which are joined together to produce the mould. This approach has similar advantages of reduced lead times for new designs and subsequent modifications, and (in the case of a facetted curved panel) improved subsequent processing due to flat facet surfaces.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

I claim:

1. A process for manufacturing a rigid panel formed of polymer matrix composite material, the panel being for attachment to a gas turbine engine and having a plurality of flat facets which combine to form a curved shape configured to allow the panel to be wrapped around at least a part of a circumference of the engine, and the panel having plural electrical conductors and fluid passages embedded therein, the process comprising:
   producing a tooling by providing a plurality of separate tooling segments, each of which corresponds to a respective flat facet of the panel and joining the tooling segments together to produce a tooling, the tooling being a mould against which the polymer matrix composite material can be moulded to manufacture the panel;
   moulding the polymer matrix composite material against the mould to manufacture the panel; and
   attaching the panel to the gas turbine engine by wrapping the panel around the at least the part of the circumference of the engine.

2. A method according to claim 1, wherein the segments are all of a standard length and of a standard angular extent.

3. A process for manufacturing a rigid panel formed of polymer matrix composite material, the panel being for attachment to a gas turbine engine and having a plurality of flat facets configured to combine to form a curved shape configured to allow the panel to be wrapped around at least a part of a circumference of the engine, and the panel having at least one of plural electrical conductors and fluid passages embedded therein, the process comprising:
   producing a tooling by providing a plurality of separate tooling segments, each of which corresponds to a respective flat facet of the panel and joining the tooling segments together to produce a tooling, the tooling being a pattern from which the mould is formed;
   using the pattern to form a mould;
   moulding polymer matrix composite material against the mould to manufacture the panel; and
   attaching the panel to the gas turbine engine by wrapping the panel around the at least the part of the circumference of the engine.

4. A method according to claim 3, wherein the segments are all of a standard length and of a standard angular extent.

* * * * *